INVENTOR.
BOONE B. OWENS
BY Henry Kolin
ATTORNEY 3,476,606
SOLID STATE ELECTROCHEMICAL DEVICE
Boone B. Owens, Calabasas, Calif., assignor to North American Rockwell Corporation
Filed July 6, 1967, Ser. No. 651,499
Int. Cl. H01m 27/10
U.S. Cl. 136—83       5 Claims

ABSTRACT OF THE DISCLOSURE

Ionically conductive solid compositions of matter and solid state electrochemical devices utilizing these compositions as solid electrolyte element therein. These compositions have an ionic conductivity greater than that of silver iodide and contain between 75 and 97.5 cationic mole percent silver cations wherein the conductivity-imparting component is an organic ammonium silver iodide salt whose preferred composition range is from $$QAg_4I_5 (QI \cdot 4AgI)$$

to $QAg_9I_{10}(QI \cdot 9AgI)$ where Q is an organic ammonium cation, preferably a quaternary ammonium cation.

Specifically preferred conductive compositions of matter are tetramethylammonium octasilver nonaiodide $$N(CH_3)_4Ag_8I_9$$

tetraethylammonium octasilver nonaiodide $$N(C_2H_5)_4Ag_8I_9$$

and pyridinium octasilver nonaiodide $HNC_5H_5Ag_8I_9$.

These solid ionic conductors are of particular utility as the electrolyte in a solid state electric cell.

CROSS REFERENCES TO RELATED APPLICATIONS

Inorganic solid ionic conductors and electric cells utilizing them are disclosed in copending applications Ser. No. 569,193, 573,743, and 573,744, all filed Aug. 1, 1966, and assigned to the assignee of the present application. Filed of even date herewith is commonly assigned copending application Ser. No. 651,498 disclosing a cathode composition of particular utility in the electric cells of this invention.

BACKGROUND OF THE INVENTION

This invention relates to solid state electrochemical devices and ionically conductive solid compositions of matter included therein. It more particularly relates to solid state electric cells in which the conductivity-imparting component of the solid electrolyte therein is an organic ammonium silver iodide salt.

Solid ionic conductors are known and are of particular utility as the electrolyte in a solid state electric cell. The silver halides have been found useful as such solid electrolytes. One device employing silver iodide as a solid electrolyte is described in U.S. Patent 2,689,876, "Solid Ion Electrolyte Battery." These solid state cells are generally advantageous compared with conventional cells and batteries with respect to shelf-life stability, leak-free properties, freedom from pressure buildup during the electrochemical reaction, and flexibility with respect to construction design and miniaturization. However, the usefulness of such devices, particularly at room temperature, is limited principally by the low ionic conductivity of the solid electrolyte. For example, the ionic conductivity at room temperature of the silver halides is about $10^{-6}$ (ohm/cm.)$^{-1}$, resulting in solid state cells having too high an internal resistance for many applications. Pressed silver iodide pellets have been reported as having an ionic conductivity at room temperature as high as $2.7 \times 10^{-4}$ (ohm-cm.)$^{-1}$.

Preparation of the quarternary ammonium silver iodide compound $N(CH_3)_4Ag_2I_3$ was reported by Kuhn and Schretzmann in, Angew. Chemie, 67, 785 (1955). The preparation of this compound was also reported by Bradley and Greene in Trans. Faraday Soc., 63 (2), 424 (1967), who found no evidence of any substance with a high conductivity. In copending application Ser. No. 569,-193 are shown alkali metal silver iodide ionic conductors having a room temperature conductivity of about 0.2 (ohm-cm.)$^{-1}$. However, for certain applications the need exists for other solid ionic conductors having a conductivity at least greater than that of the silver halides yet possessing other advantageous properties such as enhanced low temperature conductivity and lower cost of production.

SUMMARY OF THE INVENTION

It is an object of the present invention to provide conductive compositions of matter having high ionic conductivity over a wide temperature range. It is a further object to provide electrochemical devices, such as solid state electric cells and electrochemical timers, particularly suitable for use with these conductive compositions of matter.

In accordance with the present invention there are provided ionically conductive solid compositions of matter and solid state electrochemical devices utilizing these compositions as solid electroyle element therein wherein the electrolyte compositions have an ionic conductivity greater than that of silver iodide and contain at least 75 cationic mole percent, suitably between 75 and 97.5 cationic mole percent silver cations, preferably between 80 and 90 mole percent. The conductivity-imparting components of these compositions are organic ammonium silver iodide salts which may be expressed by the empirical formula $QI \cdot nAgI$, $n$ having any value between 3 and 39 inclusive and Q being an organic ammonium cation having an ionic volume between 30 and 85 cubic angstroms. Where the substituents on the nitrogen atom of Q are aliphatic groups, e.g., methyl, ethyl; or aralkyl groups, e.g., benzyl; then Q must be a quaternary ammonium ion, i.e., four carbon atoms are attached to the nitrogen atom. A preferred composition range is from $QAg_4I_5$ to $QAg_9I_{10}$ where Q preferably is a quaternary ammonium cation. The nitrogen of the organic ammonium cation complex may be attached to separate organic groups or may form part of a cyclic structure.

Specifically preferred conductive compositions of matter are tetramethylammonium octasilver nonaiodide $$N(CH_3)_4Ag_8I_9$$

tetraethylammonium octasilver nonaiodide $$N(C_2H_5)_4Ag_8I_9$$

and pyridinium octasilver nonaiodide $HNC_5H_5Ag_8I_9$.

Solid state electrochemical devices utilizing the ionic conductive compositions of this invention as solid electrolytes preferably utilize organic ammonium polyiodide salts for the associated electrode acting as electron acceptor and utilize a silver-containing composition for the electrode acting as electron donor. A preferred solid state cell includes a silver-containing anode, a solid electroylte element comprising $N(CH_3)_4Ag_8I_9$, and a polyiodide-containing cathode comprising $N(CH_2H_5)_4I_3$.

DESCRIPTION OF THE PREFERRED EMBODIMENTS

Figure 1:
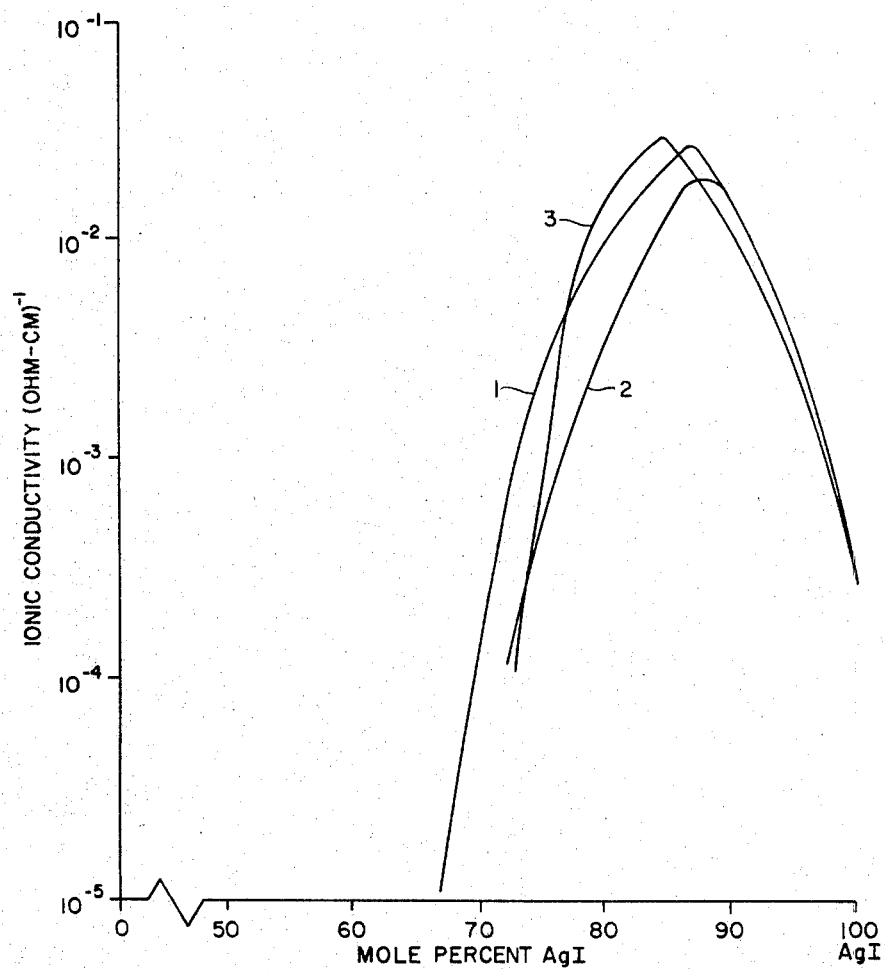
FIG. 1 is a graphical representation of the variation of ionic conductivity with increasing silver ion content for three preferred conductive compositions of matter.

The ionically conductive solid compositions of matter of the present invention are characterized as having an ionic conductivity greater than that of silver iodide, containing between 75 and 97.5 cationic mole percent silver cations, and having the empirical formula $Q_aAg_bI_{a+b}$, where Q is an organic ammonium cation having an ionic volume between 30 and 85 $A.^3$ (cubic angstroms), $a$ and $b$ being integers whose sum varies from 4 to 40, the ratio of $a/b$ varying from 1:3 to 1:39, this ratio corresponding to a range between 75 and 97.5 cationic mole percent silver cations.

The ionically conductive solid compositions are prepared by reacting one molar portion of the organic ammonium iodide with at least three molar portions of silver iodide, preferably with 4 to 9 molar portions according to the reaction $QI + nAgI \rightarrow QAg_nI_{n+1}$. The organic ammonium iodide compounds utilized for the reaction are ionic salt-like compounds in which the cation is a coordination complex of a nitrogen atom. The reactive organic ammonium iodide compound QI may be represented by the general formula $[NR_4]^+I^-$, where R represents one or more organic groups and may also be hydrogen. The central nitrogen atom of the cation complex may be attached to separate organic groups or may be part of the ring of a heterocyclic compound.

For an acyclic organic ammonium ion, i.e., one where the nitrogen is not part of the ring structure, and the substituents are aliphatic or aralkyl groups, it has been found that four carbon atoms must be linked to the nitrogen atom; that is, the ammonium compound is a quaternary ammonium compound in its strictest sense, no hydrogen being attached to the nitrogen atom. Where the four R groups are aliphatic substituents, it has been found that the total number of carbon atoms present may vary from four to nine. Illustrative of suitable aliphatic substituent groups for attachment to the nitrogen atom of the quaternary ammonium cation complex are $Me_4$, $Me_3Et$, $Me_3Pr$, $Me_3i-Pr$, $Me_2Et_2$, $MeEt_3$, $MeEt_2Pr$, $MeEt_2i-Pr$, $Et_4$, $MeEt_2Bu$, $Et_3Pr$, $Me_3Ay$ where Me=methyl, Et=ethyl, Pr=propyl, i-Pr=isopropyl, Bu=butyl, and Ay=allyl. The molecular volumes for these quarternary ammonium cations range from 42 to 80 $A.^3$. Because of the ready availability of the starting materials and the high conductivity of the resultant quarternary ammonium silver iodides, the lower alkyl groups, particularly methyl and ethyl, are preferred as substituent groups.

Substituents other than aliphatic groups may also be attached to the noncyclic nitrogen atom provided the volume of the resulting cation $Q^+$ is between 30 and 85 $A.^3$. Thus, carbocyclic, aryl and benzyl substituents may be attached in addition to aliphatic ones. Illustrative of such suitable substituent groups are trimethylcyclohexyl, trimethylphenyl and trimethylbenzyl.

The nitrogen atom may also form part of a cyclic structure. Illustrative of suitable cations are azacyclic: N,N-dimethylpyrrolidinium; azabicyclic: 8,8-dimethyl-8-azoniabicyclo[3.2.1]octane; azoniaspiro: 5-azoniaspiro[4.4]nonane; and heterocyclic: pyridinium, N-methylpyridinium, α-picolinium, N-methylquinolinium, N-methylacridinium, 1,1,2-trimethylpyrrolium, and N,N-dimethylindolium.

The size of the cation $Q^+$ is one of the important parameters determining the conductivity of the $Q_aAg_bI_{a+b}$ salts. For a high ionic conductivity (defined as greater than that of silver iodide) the size of the organic cation is between 30 and 85 $A.^3$.

The values for the volume of the cationic complex are determined by using the molecular volumes for the corresponding hydrocarbon analogs according to the equation $$V_m = \frac{1}{7.228} \frac{MW}{d_c}$$

where $V_m$ represents the molecular volume in cubic angstroms, MW is the molecular weight, and $d_c$ is the critical density in grams per cubic centimeter. Critical density values for hydrocarbons are readily available in the literature or conveniently estimated. Since molecular volume $V_m$ is proportional to the van der Waals's constant $b$, and $b$ is inversely proportional to the critical density $d_c$, the molecular volume can be readily calculated.

The calculated volumes for the hydrocarbon analogs correspond approximately to those of the organic ammonium cations since the C—C bond and the C—N bond are almost the same length and the $Q^+$ cation is isoelectronic with its hydrocarbon analog. Thus a good approximation to the size (volume) of $Q^+$ is the volume of the isoelectronic hydrocarbon.

Determination of the molecular volume of the hydrocarbon analog permits a ready selection of suitable organic ammonium cations. For example, using the upper limit of 85 $A.^3$ and where all four substituents are not aliphatic groups, it is readily determined that about five carbons can be added to a cation containing a phenyl group, about five carbons to a pyridyl system, about three in a quinolyl system, and four to five if there is a cyclohexyl group as substituent. Thus, $Et_3C_6H_5N^+$ would be one of the largest allowable cations containing a phenyl group. If the phenyl group itself is substituted with alkyl groups or separated from the nitrogen by methylene groups, then the carbon content of the other substituents attached to the nitrogen atom would have to be proportionately reduced to maintain the desired upper limit of cationic volume.

Various synthetic methods may be used for preparing the organic ammonium silver iodide conductive compositions of this invention. The specific conductivity-imparting components ordinarily need not be prepared or isolated in a high degree of purity for many applications for which these conductive compositions are used. In one method of preparation, a solid state salt reaction at annealing temperatures is utilized. Silver iodide is reacted in appropriate molar ratio with the organic ammonium iodide. The materials are intimately mixed together, e.g., by grinding, preferably pelletized, and then annealed at a temperature below the fusion temperature.

In another method, a fused salt reaction, a similar molar ratio is used, and the mixture is heated until it is molten. The melt is briefly stirred and rapidly quenched. The sample is then annealed in one or more stages at a temperature below the melting point. It may also be desirable to carry out the combined melt-anneal synthesis as described, followed by repulverizing, compacting, and reannealing of the product.

A paste preparation technique may be used in which a slurry or paste is prepared of the silver iodide and the organic ammonium iodide, followed by a multiple annealing technique using successive stages of annealing, cooling, and repulverizing.

Synthesis in an aqueous medium in which the reactants and the formed product exhibit only a limited solubility is also feasible. In such a method, the desired proportions of reactants are mixed together in water and then maintained under atmospheric reflux. Following completion of the reaction, generally indicated by a color change, the solution is cooled, the supernatant liquid is decanted, and the resulting precipitate is washed with an organic solvent and filtered under vacuum.

It is also feasible to prepare the ionic conductive composition electrochemically in the form of a thin film on the silver electrode. This electrode is immersed in an aqueous solution of the organic ammonium iodide, an inorganic salt preferably being present in solution to increase conductivity. A thin film of the conductive composition is formed on the silver foil electrode by passage of a suitable current to anodize the electrode. Such thin films of ionic conductors have applications in a variety of electrochemical devices, including batteries, timers, capacitors, and memory elements.

The ionic conductivity of the conductive composition has been found to vary with increasing percentage of silver. Phase diagram studies are indicative of the existence of the conductivity-imparting components as true single-phase compounds at but one or two regions in the composition curve. However, the solid composite of the conductivity-imparting component with nonconductive components still results in conductive compositions of matter of enhanced conductivity compared with that of the silver iodide starting material or of the organic ammonium iodides, which are generally of even poorer conductivity.

Referring to FIG. 1, there is shown the variation in ionic conductivity with silver content for three organic ammonium silver iodide systems. Curve 1 refers to the $(CH_3)_4NI$-AgI system, curve 2 to that of $(C_2H_5)_4NI$-AgI, and curve 3 to the pyridinium iodide-silver iodide system. As may be noted from these curves, for values from about 75 to 97.5 mole percent, corresponding to a molar ratio of 1:3 to 1:39 of organic ammonium iodide to silver iodide, the overall ionic conductivity is greater than that of silver iodide over this composition range. A maximum in the conductivity value appears in the QI-$n$AgI curves for values of $n$ between 6 and 8.

For the system shown in curve 1, analysis of a composition having an empirical formula corresponding to $(CH_3)_4NI \cdot 6AgI$ showed that two conductive compounds are probably present for $(CH_3)_4NI \cdot nAgI$ at values of $n$ of 4 and 8. Crystallographic analysis of a sample having a formula unit corresponding to $N(CH_3)_4Ag_4I_5$ showed that a trigonal crystal was present with lattice constants $a=12.70$ and $c=58.55$ A. Maxima with $-h+k+l \neq 3n$ ($n=0, 1, 2, 3$, etc.) are systemmatically absent from the diffraction data. Therefore, the probable space group of the crystal is R, $R\bar{3}$, R32, R3$m$, or $R\bar{3}m$.

The volume of the unit cell is 8178 A.³ If the unit cell contains $18N(CH_3)_4Ag_4I_5$ formula units, the calculated density is 4.17 g./cc. This density appears reasonable when compared to that of $RbAg_4I_5$ crystals. In the latter the volume per formula unit is 355 A.³ Subtraction of the volume per formula unit in RbI crystals, 99 A.³, and addition of that in $N(CH_3)_4I$ crystals, 181 A.³, yields $355-99+181=437$ A.³ for the estimated volume required by an $N(CH_3)_4Ag_4I_5$ formula unit. This is fairly close to $8178/18=454$ A.³

Figure 2:
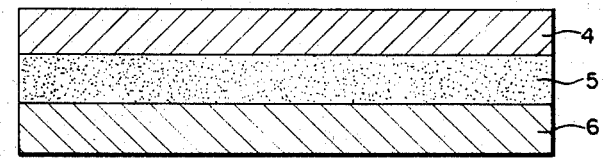
FIG. 2 is a cross sectional view of an idealized embodiment of a solid state electric cell provided by this invention.

In FIG. 2 is shown a cross sectional view of an idealized embodiment of a solid state electric cell provided by this invention. The several layers are shown in a nonscalar simplified form, an anode 4 consisting of any suitable metallic conductor which functions as an electron donor. Preferably, silver is used as the anode material, as a thin sheet or foil, although copper and other conductive materials may also be utilized. Where the organic ammonium silver iodide electrolyte is prepared electrochemically as a thin film on the anode, then the anode must consist of silver. The crux of the present invention lies in the composition of the electrolyte layer 5, which includes the solid ionic conductors of the present invention. In addition, adventitious impurities or deliberately added excess amounts of silver iodide or of the organic ammonium iodide may also be present without unduly reducing the conductivity. By adjustment of the proportions of silver iodide and the organic ammonium iodide initially utilized for the reaction to form the conductive compositions of the present invention, compositions having preselected conductivity values may be obtained. Also, certain additions may be made to electrolyte 5 for purposes of moisture absorption, stability, or the like.

A cathode 6 consists generally of a nonmetal capable of functioning as an electron acceptor, such materials being capable of oxidation by any of the electron donors which are used as anodes or capable or forming alloys therewith (e.g., Pd, Pt, etc.). Several such cathode materials are shown in U.S. Patent Re. 24,408. Because of its relatively low volatility, iodine in elemental form or preferably as part of an organic or inorganic complex is favored as a cathode material. Preferred as a source of iodine is an organic ammonium polyiodide. Conveniently, the iodine-containing compound is intermixed with carbon to form the electrode because of the electronic conductivity of carbon. However, the relative proportions of carbon and the iodine source are not critical in the range from 10 to 90 wt. percent iodine. About 30 wt. percent iodine is convenient and preferred. A preferred cell in accordance with this invention is, for example, $Ag/[N(CH_3)_4Ag_6I_7]/N(C_2H_5)_4I_3+C$. Another suitable and preferred cell is

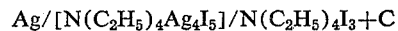

$$Ag/[N(C_2H_5)_4Ag_4I_5]/N(C_2H_5)_4I_3+C$$

The empirical formulas shown for the electrolytes are enclosed in brackets to show that the electrolyte composition is not necessarily a single phase compound.

In general, it is preferred to encapsulate the cell with a protective resin or other potting compound after electrical leads or contacts, not shown, have been attached to the electrodes. This encapsulation prevents absorption of moisture by the electrolyte, and is also particularly effective where iodine is used as cathode material in preventing loss of iodine by diffusion. While iodine, particularly in the form of an organic ammonium polyiodide, dispersed in a carbon matrix is preferred as cathode material, other electron acceptor materials may also be used, e.g. $V_2O_5$, $RbI_3$, $CsI_3$, $CsI_5$, and $NH_4I_3$.

Figure 3:
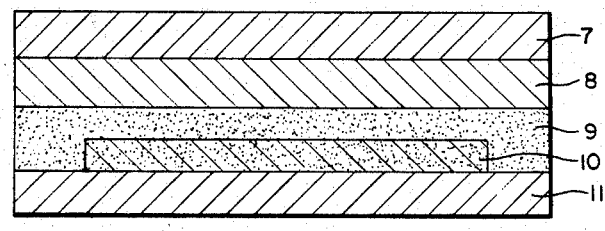
FIG. 3 is a cross sectional view of a preferred embodiment of an electric cell of this invention.

In FIG. 3 is shown a nonscalar, particularly preferred embodiment of this invention in which a solid state electric cell is provided with both a modified anode and cathode construction. The composite anode consists of an electronically conducting layer 7, e.g., silver, in contact with a mixed anode layer 8 of silver containing dispersed therein carbon and electrolyte material. A method of preparing a particularly preferred silver-containing anode composition is described and claimed in copending application S.N. 615,351, and reference should be made thereto for a more detailed description. An electrolyte layer 9 is selected from the ionically conductive organic ammonium silver iodide compositions as used herein. The composite cathode consists of a layer 10 of electron acceptor material, e.g., organic ammonium polyiodide plus carbon, containing electrolyte material dispersed therein. Preferred polyiodide cathodes are disclosed in copending application S.N. 651,498, and reference should be made thereto for a more detailed description. As a matter of preferred construction, layer 10 has been shown as not being coextensive with a conductive layer 11. By having layer 10 in contact with layer 11, but not coextensive therewith, possible short circuiting is prevented. Also, where iodine or an iodine-containing material is used as a cathode material, it is more conveniently retained in the carbon matrix. Layer 11 consists of a suitable electronically conductive material nonreactive with the cathode material, e.g., tantalum, molybdenum, niobium, carbon, or various conductive plastics which are essentially nonreactive with iodine.

It has been found that electric cells prepared as shown in FIG. 3 have enhanced electrical properties with respect to voltage and current compared with electric cells prepared in accordance with FIG. 2.

The following examples are illustrative of the practice of this invention with respect to a preferred embodiment relating to the conductive compositions of the present invention and solid state electric cells in which they are present as electrolyte. These examples should not be construed as limiting with respect to other solid state electrochemical devices or with respect to optimization of cell current and voltage, which are functions of the materials selected for electrodes and electrolyte, cell construction techniques, and overall internal resistance of the cell as determined by electrolyte layer thickness, contact resistance between adjacent layers, and other cell parameters. Optimization of these several parameters may be achieved by routine experimentation in accordance with the teachings of this invention and the known art relating to solid state cells.

Example 1.—Preparation of conductive compositions with varying silver content

Tetramethylammonium silver iodide was prepared with varying silver content using a melt-anneal technique according to the following equation:

$$N(CH_3)_4I + nAgI \rightarrow N(CH_3)_4Ag_nI_{n+1}$$

the value of $n$ being varied from 2 to about 20 (from about 67 to 95 mole percent silver cation). The tetramethylammonium iodide and varying quantities of silver iodide were intimately mixed together as fine powders to give total weights of about 10 to 20 grams for each sample. The mixtures were melted at a temperature between 200 and 300° C., quenched at room temperature, pelletized, and then annealed at about 165° C. The conductance of selected 2 gram samples in the form of pellets to which silver electrodes were attached was measured at room temperature.

For $N(CH_3)_4Ag_2I_3$ (i.e., $n=2$) the conductivity value was about $10^{-7}$ (ohm-cm.)$^{-1}$, essentially nonconductive. The conductivity values obtained for the samples were essentially as shown in curve 1 of FIG. 1, a maximum about 0.03 (ohm-cm.)$^{-1}$ being obtained for a silver content of 86 cationic mole percent (about $n=6$).

Similar results were obtained when the starting material used was tetraethylammonium iodide, as well as pyridinium iodide, corresponding essentially to the results shown in FIG. 1 for curves 2 and 3, respectively. The maximum conductivity value for tetraethylammonium silver iodide was shown for a silver content of about 88 cationic mole percent (about $n=8$). For pyridinium silver iodide the maximum conductivity value was observed for about $n=6$.

A paste method of synthesis was also used for the preparation of the tetramethyl and tetraethyl conductive compounds. Desired amounts of the quaternary ammonium iodide and silver iodide were intimately mixed and ground together, sufficient water being added to form a thick paste. The mixtures were then heated to near dryness in an oven at about 80° C. and then further dried in vacuum. The resulting product was ground and pelletized followed by annealing in an argon atmosphere at a temperature of about 125° C. for 8 hours to several days. It was found that samples prepared in this manner showed a maximum in the conductivity curve at a slightly higher silver content corresponding to about 88 cationic mole percent ($n=8$).

Tetramethylammonium silver iodide was also prepared by mixing 2 g. $N(CH_3)_4I$ and 14 g. AgI (1:6 molar ratio) in 60 g. water. The reactants were boiled together for 1 hour, a change in the color of the solid phase from yellow to white indicating that the silver iodide was being consumed. The solution was then cooled, the supernatant liquid was decanted, and the precipitate was washed with acetone and filtered over vacuum. X-ray analysis of the product showed that two conductive phases corresponding to $n=8$ and $n=4$ were present.

Example 2.—Synthesis of $QAg_nI_{n+1}$ compositions for values of $n=4, 6,$ and $8$ Basically, the methods of preparation described under Example 1 were used, particularly the melt-anneal method, for the reaction between QI and AgI. Several samples were also prepared by paste synthesis techniques, as well as by use of multiple annealing. The results obtained are shown in Table 1 for the compositions obtained by the reaction $$QI + nAgI \rightarrow QAg_nI_{n+1}$$

for value of $n$ of 4, 6, and 8. The conductivity values and the ionic volume of the organic ammonium cation are listed.

TABLE 1.—CONDUCTIVITY OF ORGANIC AMMONIUM SILVER IODIDES

| QI | $n$ (molar ratio AgI/QI) | Conductivity (ohm-cm.)$^{-1}$ | Ionic Volume of Q+ (A.$^3$) |
|---|---|---|---|
| $(CH_3)_4NI$ | 4 | 0.01 | 42 |
|  | 6 | 0.03 |  |
|  | 8 | 0.03 |  |
| $C_2H_5N(CH_3)_3I$ | 6 | 0.04 | 50 |
| $(C_2H_5)_2N(CH_3)_2I$ | 6 | 0.05 | 58 |
| $(C_2H_5)_3NCH_3I$ | 6 | 0.03 | 60 |
| $(C_2H_5)_4NI$ | 4 | 0.003 | 68 |
|  | 6 | 0.02 |  |
|  | 8 | 0.03 |  |
| $(CH_3)_3NC_3H_7I$ | 6 | 0.03 | 56 |
| $(CH_3)_3NCH(CH_3)_2I$ | 6 | 0.04 | 55 |
| $CH_3(C_2H_5)_2NCH(CH_3)_2I$ | 6 | 0.02 | 62 |
| $CH_3(C_2H_5)_2NC_3H_7I$ | 6 | 0.002 | 75 |
| $(C_2H_5)_3NC_3H_7I$ | 6 | 0.002 | 78 |
| $(CH_3)(C_2H_5)_2C_4H_9I$ | 6 | 0.0008 | 80 |
| $C_6H_{11}NH_3I$ (Cyclohexylammonium iodide) | 8 | 0.007 | 44 |
| $(CH_3)_3NC_6H_{11}I$ (Cyclohexyltrimethylammonium iodide) | 8 | 0.0005 | 75 |
| $C_5H_{10}N(CH_3)_2I$ (1,1-dimethylpiperidinium iodide) | 8 | 0.05 | 66 |
| $C_4H_8N(CH_3)_2I$ (1,1-dimethylpyrrolidinium iodide) | 8 | 0.05 | 50 |
| $C_5H_{10}NH_2I$ (Piperidinium iodide) | 8 | 0.02 | 43 |
| $C_4H_8NH_2I$ (Pyrrolidinium iodide) | 8 | 0.005 | 38 |
| $C_5H_{10}N(CH_3)(C_4H_9)I$ (1-methyl-1-butylpiperidinium iodide) | 8 | 0.001 | 80 |
| $(CH_3)_3NC_6H_5I$ (Trimethylphenylammonium iodide) | 4 | 0.01 | 68 |
| $(CH_3)_2C_2H_5NC_6H_5I$ (Ethyldimethylphenylammonium iodide) | 4 | 0.005 | 76 |
| $C_6H_5NH_3I$ (Phenylammonium iodide) | 8 | 0.003 | 44 |
| $C_6H_5CH_2N(CH_3)_3I$ (Benzyltrimethylammonium iodide) | 8 | 0.01 | 76 |
| $C_5H_5NCH_2C_6H_5I$ (1-benzylpyridinium iodide) | 4 | 0.002 | 75 |
| $C_5H_5NHI$ (Pyridinium iodide) | 7 | 0.04 | 36 |
| $C_5H_5NCH_3I$ (1-methylpyridinium iodide) | 4 | 0.01 | 441 |
|  | 6 | 0.02 |  |
| $C_9H_7NCH_3I$ (1-methylquinolinium iodide) | 4 | 0.01 | 61 |
| $C_9H_7NHI$ (Quinolinium iodide) | 8 | 0.004 | 66 |
| $C_9H_7NC_2H_5I$ (1-ethylquinolinium iodide) | 4 | 0.002 | 66 |

Example 3.—Solid state electric cells with organic ammonium silver iodide electrolyte Test cells were prepared having a configuration essentially similar to that shown in FIG. 3. For the composite anode a copper wafer made contact with 1 gram of an anode mix consisting of silver powder containing dispersed therein carbon and conductive electrolyte material $$RbAg_4I_5$$

The composite cathode consisted of a titanium wafer in contact with 1 gram of a cathode mix containing $RbI_3$ as electron acceptor, together with carbon and $RbAg_4I_5$. The organic ammonium silver iodide electrolyte composition was about 3 grams in weight. All of the conductive compositions listed in Table 2 functioned as suitable electrolytes in the solid state cells. For the cell containing pyridinium heptasilver octaiodide electrolyte, the cathode mix contained $(C_2H_5)_4NI_3$ as electron acceptor in place of $RbI_3$.

TABLE 2.—ELECTROCHEMICAL CELLS
[Ag/Electrolyte/RbI₃]

| Electrolyte empirical formula | Open Circuit EMF (volts) | Flash Current (milliamperes) |
|---|---|---|
| $(C_2H_5)_3NCH_3Ag_4I_5$ | 0.65 | 19 |
| $(C_2H_5)_3NC_3H_7Ag_4I_5$ | 0.64 | 2.5 |
| $(CH_3)_3NC_6H_5Ag_4I_5$ | 0.66 | 20 |
| $C_2H_5N(CH_3)_3Ag_4I_5$ | 0.65 | 50 |
| $(CH_3)_4NAg_4I_5$ | 0.66 | 120 |
| $(CH_3)_4NAg_6I_7$ | 0.66 | 100 |
| $C_5H_5NHAg_7I_8$ | 0.66 | 650 |

Example 4.—Solid state electrochemical timer

A solid state coulometer for use as a timing device was assembled using as electrolyte element a conductive composition having the empirical formula $$N(C_2H_5)_4Ag_4I_5$$

equivalent to 80 cationic mole percent silver ion.

The device was built in tubular form with the outer timing electrode consisting of a titanium tube 0.610 in. long, 0.210 in. diameter and having a wall thickness of 0.025 in. The inner wall of the titanium tube was lined with 0.3 g. of carbon-polycarbonate mixture. The inner counter-electrode, concentric with the outer electrode and used as a reservoir of silver, was a 0.3-g. blend of silver, carbon, and $RbAg_4I_5$. The solid electrolyte 0.6 g., was disposed between the two electrodes and in intimate contact with each.

In operating the device, a fixed amount of silver was first transported from the counter-electrode to the timing electrode by passage of a constant preselected current through the device for a preselected time. During timing operation, a constant current, flowing in a reverse direction to the "setting" current, is used to strip the silver from the timing electrode, resulting in a marked increase in voltage across the device. This voltage increase is used as a signal-actuating mechanism. Thus, the foregoing device was "set" at 500 microamp. for 3 seconds with the positive power lead connected to the counter-electrode. A voltage drop of 115 millivolts was recorded across the device during "setting." "Stripping" was accomplished with the positive power lead connected to the timing electrode and using a 10-microamp. current. An initial voltage drop of 8 millivolts was recorded across the device. The voltage drop started rising rapidly at about 140 seconds, reaching cutoff voltage of 630 millivolts at 149 seconds. The accuracy of the device is seen from a comparison of the initial input of 1500 microamp.-sec. (500 microamp. for 3 sec.) with a timing output of 1490 microamp.-sec. (10 microamp. for 149 sec.).

While the exact mechanism of ionic conductivity of the conductive compositions of the present invention is but imperfectly understood, it is believed that the ionic conductivity occurs by a transport of silver ions through the electrolyte. Furthermore, while the ionically conductive solid compositions of matter have been represented by the empirical formula $QAg_nI_{n+1}$, only for certain values of $n$ is a single phase conductivity-imparting component believed to be present. Such components have been observed for $n=4$ and $n=8$. Thus, a composition corresponding to $QAg_6I_7$ may consist of a multiphase solid state mixture of $QAg_4I_5$ and $QAg_8I_9$. However, the conductive compositions of the present invention need not be obtained in a high degree of purity except where maximum ionic conductivity is desired. Thus, small amounts present of the starting materials or of adventitious impurities will not unduly degrade the ionic conductivity values. Further, nonreactive diluent materials may be added to vary the ionic conductivity, which will also be varied for a given organic ammonium silver iodide composition by varyng the amount of silver present, even approaching 100 mole percent AgI. In addition, certain inorganic compounds such as silica as well as organic polymers and other additives may be included with the conductive compositions for purposes of moisture absorption, stability, etc.

The conductive compositions of the present invention are based on use of an organic ammonium cation complex. However, based on considerations of valence and atomic size, it is contemplated that phosphorus, arsenic, and antimony atoms may be used in place of the central nitrogen atom in an onium cation complex.

It should further be understood that many variations can be made with respect to the solid state electrochemical devices provided by the present invention without departing from the inventive concept herein. Improved features of construction used for conventional solid state electric cells, in order to minimize polarization and assure cathode and anode stability and the like, may be readily utilized with little or no modification of the preferred cell construction illustrated herein, with the further advantage of obtaining highly superior electric cell characteristics because of the particular conductive properties of the electrolytes used in the present cells. Furthermore, inasmuch as the ionic conductivity of the electrolyte materials of this invention is essentially due to the silver ions, as determined by transport number measurements, the teachings of the prior art with respect to solid state electric cells employing silver halide electrolytes may be advantageously applied with respect to the electric cell of this invention. Also, while the present electric cell is of principal interest and utility as a primary cell, it may also be utilized as a secondary cell, particularly by selecting a cathode electron acceptor, e.g., a sulfide or polyiodide, which produces a reaction product with silver having a lower decomposition potential than that of the solid electrolytes hereof. It has also been found that when electric cells are made using the electrolytes of the present invention together with an organic ammonium polyiodide cathode structure, the resultant solid state electric cells are of particular utility at both low and high temperatures over a wide temperature range from about −50° C. to about 150° C. and also show long shelf-life stability.

Accordingly, while the principle of the invention and its preferred mode of operation have been explained in accordance with the patent statutes, and what is now considered to represent its best embodiment has been illustrated and described, it should be understood that within the scope of the appended claims, the invention may be practiced otherwise than as specifically illustrated and described.

I claim:

1. An electrochemical device which includes a solid electrolyte element comprising an ionically conductive composition of matter having the formula $QAg_nI_{n+1}$, $n$ varying from 3 to 39 and Q being an organic ammonium cation having a volume between 30 and 85 cubic angstroms, and means for providing a flow of ions through said electrolyte element.

2. An electrochemical device according to claim 1 wherein said conductive composition of matter four groups attached to the nitrogen atom of Q are selected from methyl and ethyl groups and $n$ has a value between 4 and 9.

3. An electrochemical device according to claim 1 consisting of a solid state electric cell comprising a solid anode, a solid cathode, and said solid electrolyte element disposed between said anode and said cathode.

4. A device according to claim 3 wherein said anode comprises silver and said cathode comprises an intimate mixture of carbon and an iodine source.

5. A device according to claim 4 where at least one of said anode and cathode includes solid electrolyte material dispersed therein.

References Cited

UNITED STATES PATENTS 3,379,569   4/1967   Berger et al.

WINSTON A. DOUGLAS, Primary Examiner
A. SKAPARS, Assistant Examiner

U.S. Cl. X.R.
136—100, 153

PO-1050
(5/69)

UNITED STATES PATENT OFFICE
CERTIFICATE OF CORRECTION

Patent No. 3,476,606                    Dated November 4, 1969

Inventor(s) Boone B. Owens

It is certified that error appears in the above-identified patent and that said Letters Patent are hereby corrected as shown below:

Column 2, line 68, that portion of the formula enclosed in parentheses should read --$C_2H_5$--

Column 5, line 43, "R" should read --$R_3$--

Column 6, line 6, "or" (second instance) should read --of--

Column 7, line 38, after "maximum" insert --of--

SIGNED AND
SEALED
FEB 9 1971

(SEAL)
Attest:

Edward M. Fletcher, Jr.
Attesting Officer

WILLIAM E. SCHUYLER, JR.
Commissioner of Patents